United States Patent
Chen

(10) Patent No.: US 7,215,438 B2
(45) Date of Patent: May 8, 2007

(54) TRANSMITTANCE AND RECEIVING METHOD OF AN INTERNET FACSIMILE SYSTEM

(75) Inventor: Ko-Meng Chen, Hou Lung Jen (TW)

(73) Assignee: Teco Image Systems Co., Ltd, Taipei (TW)

( * ) Notice: Subject to any disclaimer, the term of this patent is extended or adjusted under 35 U.S.C. 154(b) by 936 days.

(21) Appl. No.: 10/211,324

(22) Filed: Aug. 5, 2002

(65) Prior Publication Data

US 2004/0021896 A1    Feb. 5, 2004

(51) Int. Cl.
  H04N 1/00    (2006.01)
  G06F 15/00   (2006.01)
  G06F 13/00   (2006.01)

(52) U.S. Cl. ............... 358/1.15; 358/402; 358/403; 358/404; 379/100.01

(58) Field of Classification Search ........... 358/1.15, 358/407, 402, 403, 404; 379/100, 100.01; 709/206
See application file for complete search history.

(56) References Cited

U.S. PATENT DOCUMENTS

| 5,224,156 | A  | * | 6/1993  | Fuller et al. ....... 379/100.08 |
| 5,790,790 | A  | * | 8/1998  | Smith et al. ........... 709/206 |
| 6,956,663 | B1 | * | 10/2005 | Iida ................... 358/1.15 |
| 6,961,137 | B1 | * | 11/2005 | Tamura ................ 358/1.15 |
| 2002/0054362 | A1 | * | 5/2002 | Chen ..................... 358/402 |
| 2003/0117666 | A1 | * | 6/2003 | Eguchi et al. ........... 358/402 |
| 2003/0117668 | A1 | * | 6/2003 | Takeuchi ................ 358/463 |

* cited by examiner

Primary Examiner—Kimberly Williams
Assistant Examiner—Scott A. Schlack
(74) Attorney, Agent, or Firm—Browdy and Neimark, PLLC

(57) ABSTRACT

Transmitting and receiving methods of an Internet facsimile system are disclosed. The Internet facsimile system includes a telephone network, a transmitting network, a server and an office machine. The server has therein a network interface and a memory unit. The office machine includes a data storage means and network interface. The office machine transmits a fax through the telephone network and establishes a connection with the server through the transmitting network. The storage means has a memory capacity much less than that of the memory unit. Therefore, the transmitting and receiving methods of an Internet facsimile system capitalize on the tremendous memory capacity provided by the server as an intermediate storage such that the memory shortage of the office machine is avoided.

17 Claims, 4 Drawing Sheets

TRANSMITTANCE AND RECEIVING METHOD OF AN INTERNET FACSIMILE SYSTEM

BACKGROUND OF THE INVENTION

1. Field of the Invention

The present invention relates to transmitting and receiving methods of an Internet facsimile (fax) system and in particular, to a facsimile service method of a fax device capable of connecting to a server.

2. Description of the Prior Art

Fax machines are typically used to transmit facsimiles of hardcopy paper documents to other fax machines. A fax machine (the transmitting end) first connects to another fax machine (the receiving end) a fax number, and then transmits information with a fax signal. The quality of the faxed copy depends on the type of fax machines used, noise in the fax signal, and most importantly the quality of the original document.

However, when the fax machine is operated in a high-resolution mode or scans multiple documents with complicated plots for example, the memory shortage becomes a problem. In this case, the insufficient memory capacity usually causes failure in transmitting or receiving documents, and therefore a waste of communication cost.

Accordingly, there is a strong need for improved transmitting and receiving methods of an Internet facsimile (fax) system which are inexpensive and have good reliability and capacity.

SUMMARY OF THE INVENTION

The main objective of the present invention is to provide transmitting and receiving methods of an Internet facsimile system to solve the above-mentioned problems. The Internet facsimile system is connected to a server. By capitalizing on the tremendous memory capacity provided by the server as an intermediate storage, the memory shortage of the office machine is avoided.

Another objective of the present invention is to provide transmitting and receiving methods of an Internet facsimile system, in which either during transmitting or receiving process, the data are first transmitted and stored to the server. After being completely stored to the server, the data then start to be accessed.

In accordance with the present invention, a transmitting method of an Internet facsimile system is provided. The transmitting method comprises the following steps: scanning paper documents by a user with the office machine; storing a scanned image data to the storage means; transmitting and storing a transmitting signal and the scanned image data from the storage means to the memory unit of the server through the transmitting network; after the paper documents being completely scanned and the scanned image data being completely stored to the server, the office machine turning to access the data stored in the server, and obtain a fax number; the office machine starting transmitting the data to a receiving end where the fax number is directed to while accessing the data and signal stored in the server; and erasing the data and signal stored in the server.

In another aspect of this invention, a receiving method of an Internet facsimile system is provided. The receiving method comprises the following steps: the office machine obtaining an input call from the telephone network; the office machine receiving a transmitted document data from the telephone network, and a receiving signal and image data of the transmitted document data being transmitted and stored to the memory unit of the server through the transmitting network; after the transmitted document data being completely received and stored to the server the office machine turning to access the transmitted document data stored in the server; the office machine starting printing a fax; and erasing the transmitted document data stored in the server Other objects, advantages and novel features of the invention will become more clearly and readily apparent from the following detailed description when taken in conjunction with the accompanying drawings.

DETAILED DESCRIPTION OF THE PREFERRED EMBODIMENT

Figure 1:
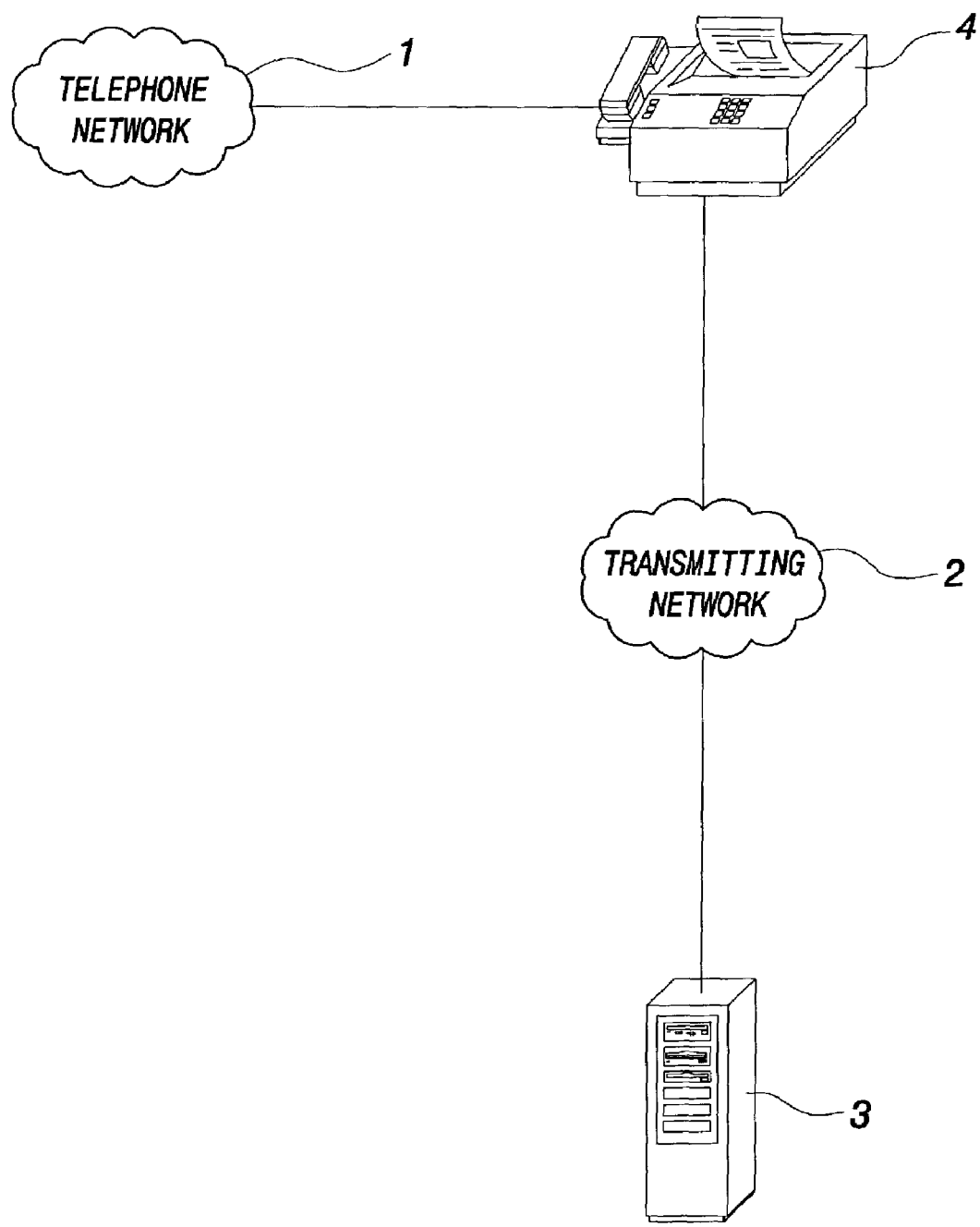
FIG. 1 illustrates the hardware system according to the present invention.
Figure 2:
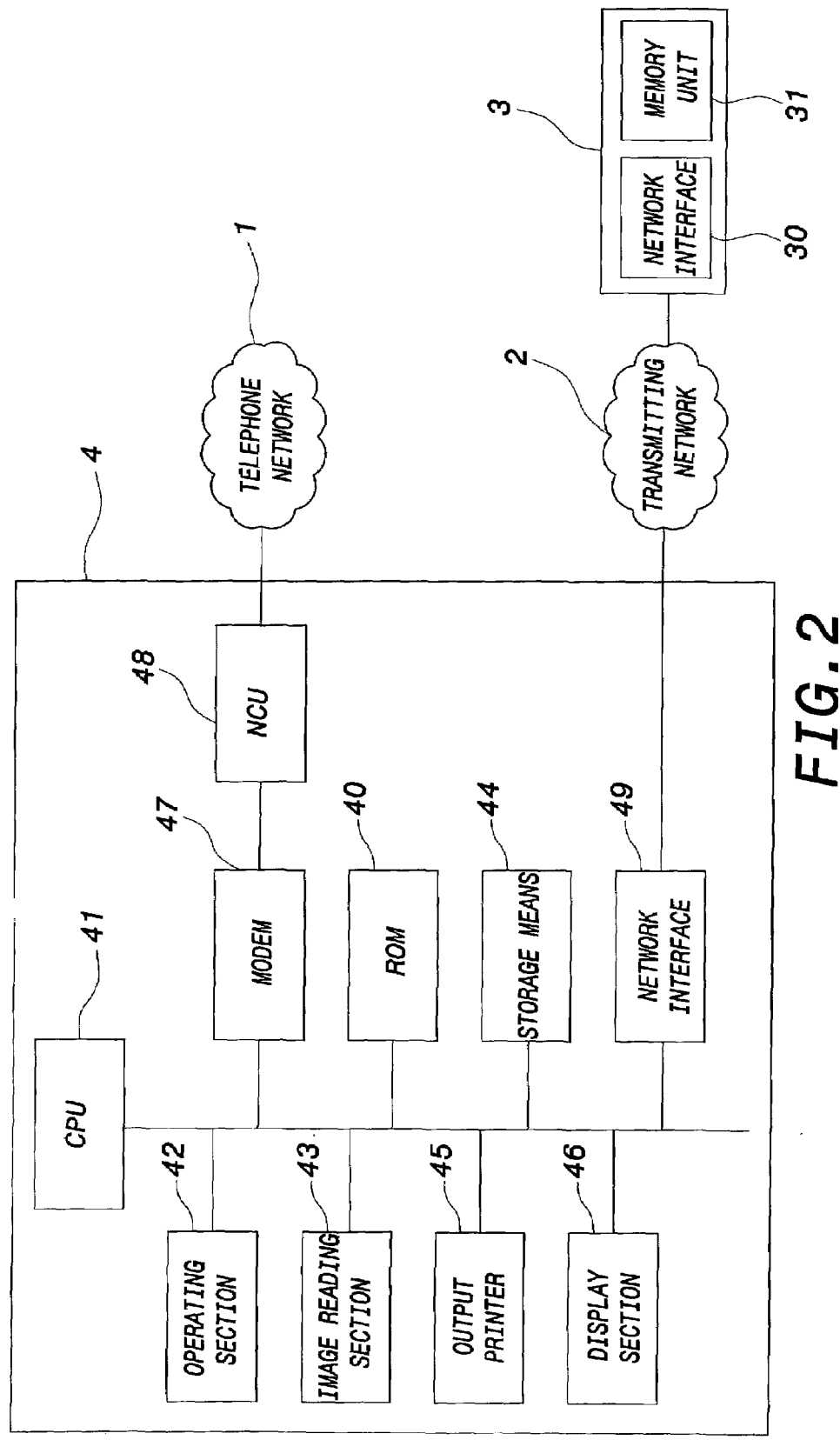
FIG. 2 is a circuit block diagram according to the present invention.

Please refer to FIG. 1 and FIG. 2. FIG. 1 illustrates the hardware system according to the present invention. FIG. 2 is a circuit block diagram according to the present invention. The present invention is directed to an Internet facsimile (fax) system comprising a telephone network 1, a transmitting network 2, a server 3 and an office machine 4.

The telephone network 1 may be a Public Switched Telephone Network (PSTN). The transmitting network 2 may be an Internet, a LAN, or a WAN. The server 3 may be an FTP server having therein a network interface 30 for connecting an Ethernet and a memory unit 31 such as a hard disk.

The office machine 4 may be a fax machine or a multi-function product (MFP). The office machine 4 transmits a fax through the telephone network 1 and establishes a connection with the server 3 through the transmitting network 2. The office machine 4 comprises a read only memory (ROM) 40, a central processing unit (CPU) 41, an operating section 42, an image reading section 43, a data storage means 44, an output printer 45, a display section 46, a modem 47, a network control unit (NCU) 48, and a network interface 49.

The ROM 40 stores the associated control procedure and control data. The CPU 41 is the control center of the office machine 4 and is used to execute the above-mentioned control procedure and control data. The operating section 42 comprises a plurality of finger buttons, one-touch keys, and multiple control keys for operating the office machine 4. The image reading section 43 is used to scan paper documents and transform the scanned plots or documents into black-and-white image data. The storage means 44 may be a random access memory (RAM), preferably a SDRAM, or a flash memory having a memory capacity much less than that of the memory unit 31. The storage means 44 is used to store the image data and the transmitting and receiving signals.

The output printer 45 is used to mark the image data with black dots on the recording paper. The display section 46 is an LCD for demonstrating the current operation status. The modem 47 is used to modulate or demodulate the transmitted or received data.

The NCU 48 is connected with the telephone network 1 for generating the output call and receiving the input call from the telephone line.

The network interface 49 provides an Ethernet connection. The network interface 49 connects the transmitting network 2 and the network interface 30 of the server 3.

Accordingly, after the office machine 4 connects the transmitting network 2, the server 3 functions as an outer memory of the office machine 4, which extends the memory capacity of the office machine 4 (i.e. the storage means 44). The flow paths of transmitting and receiving of this invention are now discussed in detail with reference to FIG. 3 and FIG. 4.

Figure 3:
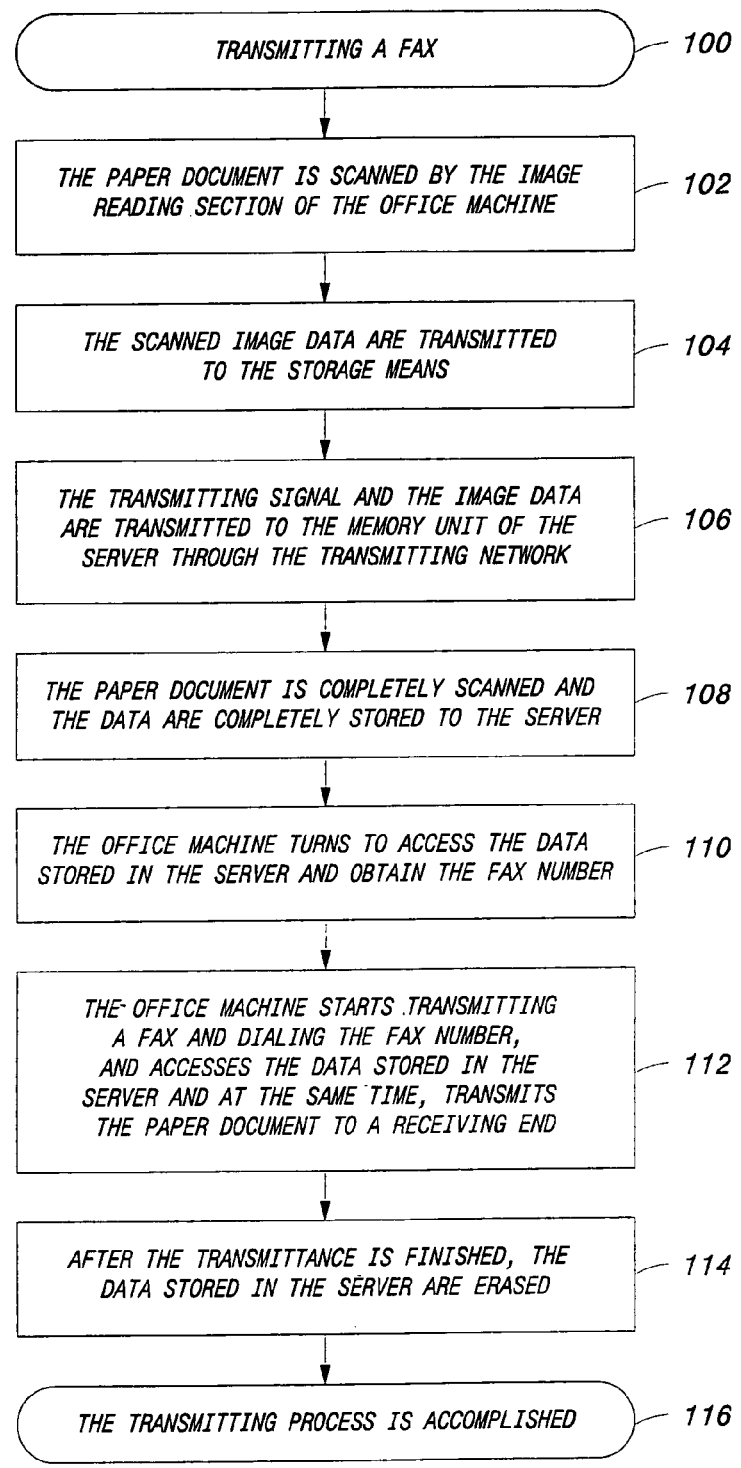
FIG. 3 is a flowchart illustrating the transmitting process according to the present invention.

Referring to FIG. 3, when transmitting a fax (step 100), the paper document is scanned by the image reading section 43 of the office machine 4 (step 102), and the scanned image data are then transmitted to the storage means 44 (step 104). The transmitting signal including a machine name, a fax number, a page number, a fax time, etc. of a receiving end, and the image data are transmitted to the memory unit 31 of the server 3 through the transmitting network 2 (step 106). After the paper document transmittance is accomplished and the data are completely stored to the server 3 (step 108), the office machine 4 turns to access the data stored in the server 3 (in real time or at a pre-selected time), and obtain the fax number (step 110). The office machine 4 is then activated to start transmitting a fax and dialing the fax number. At this phase, the office machine 4 accesses the data stored in the server 3 and at the same time, transmits the paper document to a receiving end (step 112), wherein the data are stored in the storage means 44 intermediately. After the transmittance is finished, the data stored in the server 3 are erased (step 114) and then the transmitting process is accomplished (step 116).

Figure 4:
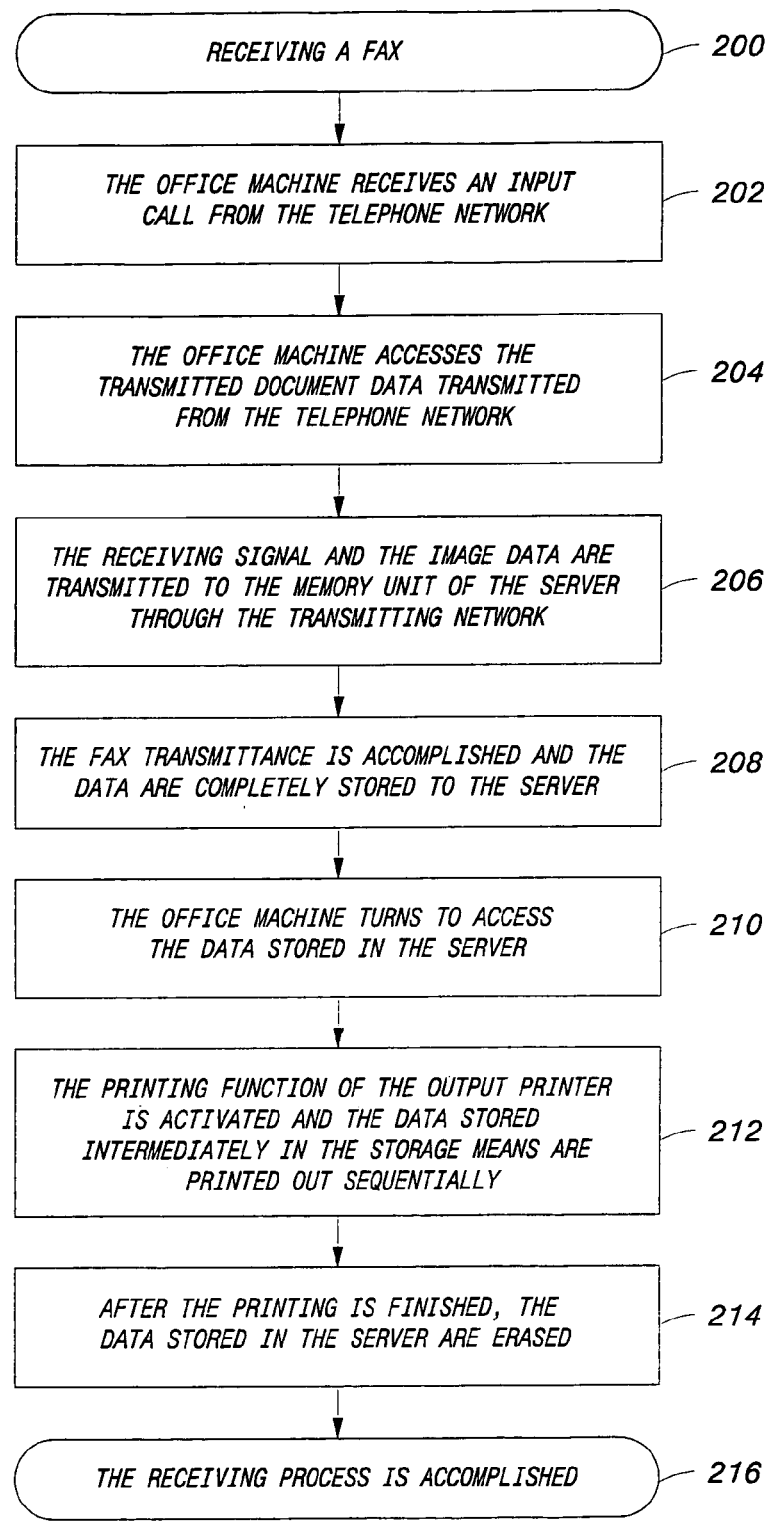
FIG. 4 is a flowchart illustrating the receiving process according to the present invention.

Referring to FIG. 4, when receiving a fax (step 200), the office machine 4 receives an input call from the telephone network 1 (step 202). The 44—office machine 4 then accesses the transmitted document data including a receiving signal and image data transmitted from the telephone network 1 (step 204), wherein the transmitted document data are stored in the storage means 44 intermediately. The receiving signal including a machine name, a fax number, a page number, a fax time, etc. of a transmitting end, and the image data are transmitted to the memory unit 31 of the server 3 through the transmitting network 2 (step 206). It is noteworthy that since the storage means 44 acts as a buffer means, the user can simultaneously implement scan and fax actions on the office machine 4 and the scanned data are temporarily stored in the storage means 44. After the fax transmittance is accomplished and the data are completely stored to the server 3 (step 208), the 44 office machine 4 turns to access the data stored in the server 3 (in real time or at a pre-selected time) (step 210). Since the document title displays a receiving signal, the office machine 4 activates the printing function of the output printer 45 and the data stored intermediately in the storage means 44 will be printed out sequentially (step 212). After the printing is finished, the data stored in the server 3 are erased (step 214) and then the receiving process is accomplished (step 216).

From above, when transmitting tremendous data or documents, the system of this invention is activated. The scanned data are transferred to the server 3 and stored in the server 3. The office machine 4 then accesses the stored data in the server 3, and at the same time, fax function of the office machine is activated to transmit the document. After the transmittance is finished, the data stored in the server 3 are erased. When receiving tremendous data or documents, the system of this invention is activated. The scanned data are transferred to the server 3 and stored in the server 3. The office machine 4 then accesses the stored data in the server 3, and at the same time, the printing function of the office machine is activated to print out the document. After finishing printing, the data stored in the server 3 are erased. By doing this, the memory shortage problem of the fax machine in the prior art is solved.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A transmitting method of an Internet facsimile system, the Internet facsimile system comprising a telephone network, a transmitting network, a server and an office machine, the server having therein a network interface and a memory unit, the office machine comprising a data storage means and a network interface, wherein the office machine transmits a fax through the telephone network and establishes a connection with the server through the transmitting network, and wherein the storage means has a memory capacity much less than that of the memory unit, the method comprising following steps:
   (a) scanning paper documents into the office machine to create scanned image data;
   (b) storing the scanned image data in the storage means;
   (c) transmitting a transmitting signal and the scanned image data from the storage means to the memory unit of the server through the transmitting network, and storing the transmitting signal and the scanned image data in the memory unit;
   (d) after completion of said transmitting and storing steps, accessing the transmitting signal and the scanned image data from the memory unit by the office machine, and obtaining a fax number of another machine to which the stored image data is to be transmitted;
   (e) activating the office machine to establish a connection with the other machine, accessing the data stored in the server, and transmitting the accessed data to the other machine through the telephone network; and
   (f) deleting the stored data and signal from the server.

2. The transmitting method of the Internet facsimile system as claimed in claim 1 wherein the telephone network is a Public Switched Telephone Network (PSTN).

3. The transmitting method of the Internet facsimile system as claimed in claim 1 wherein the transmitting network is the Internet, a LAN, or a WAN.

4. The transmitting method of the Internet facsimile system as claimed in claim 1 wherein the memory unit is a hard disk.

5. The transmitting method of the Internet facsimile system as claimed in claim 1 wherein the office machine is a fax machine or a multi-function product (MFP).

6. The transmitting method of the Internet facsimile system as claimed in claim 1 wherein the storage means is a random access memory (RAM) or a flash memory.

7. The transmitting method of the Internet facsimile system as claimed in claim 1 wherein the transmitting signal comprises a machine name, the fax number, a page number, and a fax time of the receiving end.

8. The transmitting method of the Internet facsimile system as claimed in claim 1 wherein in step (d), the office machine accesses the data stored in the server either in real time or at a pre-selected time.

9. A receiving method of an Internet facsimile system, the Internet facsimile system comprising a telephone network, a transmitting network, a server and an office machine, the server having therein a network interface and a memory unit, the office machine comprising a data storage means and a network interface, wherein the office machine receives a fax from the telephone network and establishes a connection with the server through the transmitting network, and wherein the storage means has a memory capacity much less than that of the memory unit, the method comprising following steps:
  (a) supplying an input call to the office machine from the telephone network;
  (b) receiving, at the office machine, a transmitted document data from the telephone network, and transmitting a receiving signal and image data of the transmitted document data to the memory unit of the server through the transmitting network;
  (c) after the transmitted document data has been completely received and stored in the server, causing the office machine to access the transmitted document data stored in the server;
  (d) activating the office machine to start printing the fax; and
  (e) after finishing printing, erasing the transmitted document data stored in the server.

10. The receiving method of the Internet facsimile system as claimed in claim 9 wherein the telephone network is a Public Switched Telephone Network (PSTN).

11. The receiving method of the Internet facsimile system as claimed in claim 9 wherein the transmitting network is the Internet, a LAN, or a WAN.

12. The receiving method of the Internet facsimile system as claimed in claim 9 wherein the memory unit is a hard disk.

13. The receiving method of the Internet facsimile system as claimed in claim 9 wherein the office machine is a fax machine or a multi-function product (MFP).

14. The receiving method of the Internet facsimile system as claimed in claim 9 wherein the storage means is a random access memory (RAM) or a flash memory.

15. The receiving method of the Internet facsimile system as claimed in claim 9 wherein the receiving signal of step (c) comprises a machine name, the fax number, a page number, and a fax time of the receiving end.

16. The receiving method of the Internet facsimile system as claimed in claim 9 wherein in step (c), a user simultaneously implements a scan and a fax actions on the office machine, scanned data are temporarily stored in the storage means.

17. The receiving method of the Internet facsimile system as claimed in claim 9 wherein in step (c), the office machine accesses the transmitted document data stored in the server either in real time or at a pre-selected time.

* * * * *